Oct. 22, 1940.                A. O. WILLIAMS                 2,219,144
                              UNIVERSAL JOINT
                           Filed Aug. 10, 1939
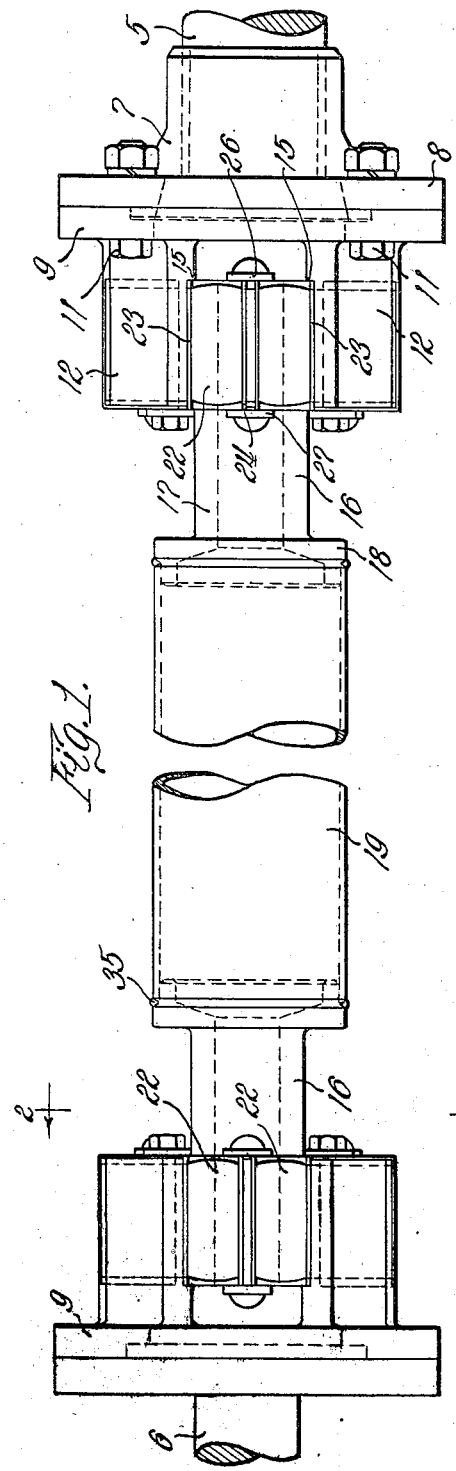
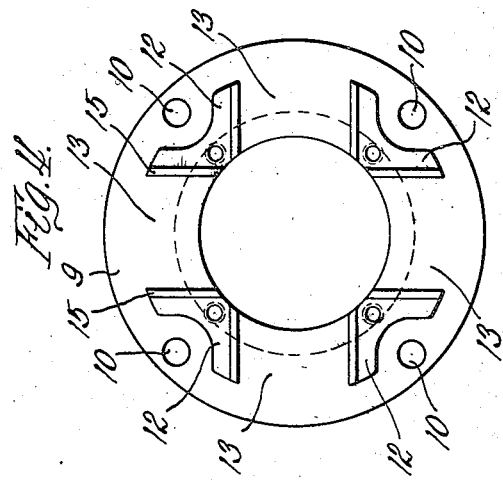
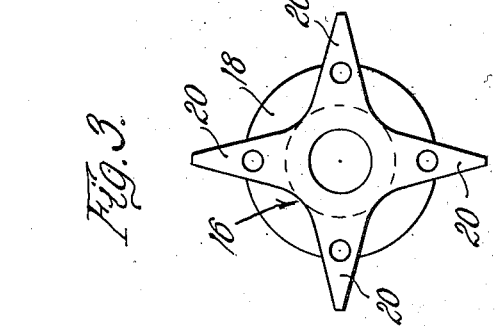
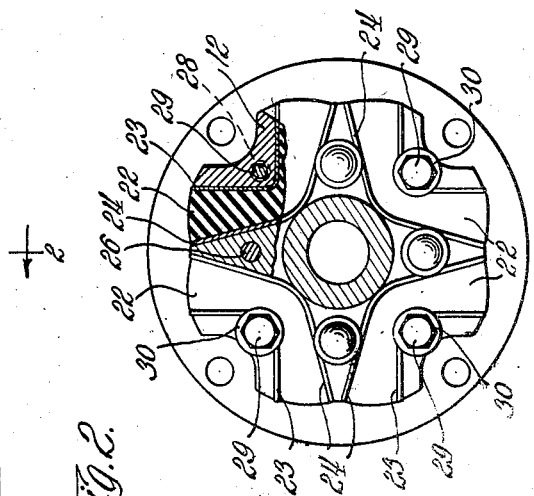
INVENTOR
ALFRED O. WILLIAMS.
BY Walter E. Schirmer
ATTORNEY Patented Oct. 22, 1940

2,219,144

UNITED STATES PATENT OFFICE 2,219,144

UNIVERSAL JOINT

Alfred O. Williams, Battle Creek, Mich.

Application August 10, 1939, Serial No. 289,371

14 Claims. (Cl. 64—14)

This invention relates to universal joints, and in general concerns itself primarily with universal joints for connecting two shaft sections together to transmit torque therebetween. Such joints are used for transmitting drive from a prime mover to the mechanism to be driven, such as the propeller shaft in a motor vehicle or a drive shaft from an electric motor to a power shaft, or for other drive transmitting purposes such as couplings between generators and motors, or between motors and compressors, or other mechanisms.

One of the primary objects of the present invention is to provide an assembly or joint in which there is no metallic connection between the shaft sections whereby they are entirely insulated from each other both mechanically and electrically. This prevents the transmission of noise or vibration between the shaft sections, and in some installations, the electrical insulation is of distinct advantage, especially in cases where an electric motor is employed as a prime mover.

Broadly speaking, the present invention contemplates the use of rubber cushioning means between companion flanges formed on the adjacent ends of the shaft sections, the rubber being in compression for transmitting the torque, and being so arranged as to resist movement caused by misalinement between the shaft sections by an arrangement such that such misalinement produces shear stresses on the same rubber that is employed for transmitting torque. Due to this arrangement, any whip or crank action which may occur at a universal joint due to misalinement of the section, results only in placing the rubber under shear and is not capable of producing any permanent deformation of the parts, or any metallic contact between the two shaft sections.

The present invention relates to the general design shown in my copending application, Serial No. 226,671, filed August 25, 1938, and embodies certain improvements and refinements in construction which simplify the assembly and produce a better action at the joint. In addition, the present construction has the distinct advantage of facilitating the assembly of the parts, and also the removal of the cushioning means for inspection or replacement without requiring dismantling of the shaft sections.

Primarily, the present invention comprises the provision of a cross member secured to one shaft section and having radially extending arm portions which are adapted to be disposed intermediate bosses or co-acting surfaces carried by the mating member, the intermediate spaces being adapted to receive rubber inserts which are fastened in position by a simplified securing means, and cannot under any circumstances slip or move while the assembly is in operation. The cushioning means of the present invention, preferably, comprises generally angle-shaped rubber inserts which are confined within metallic plates vulcanized thereto and shaped to fit within the spaces between the arms and the mating receptacle in such manner that it is impossible to effect displacement of the inserts during operation.

The present joint has the distinct advantage of a great amount of flexibility and cushioning action, while yet retaining the positive control of the torque transmission even when the misalinement approaches the maximum permissible range. Further, the present joint is so designed that the rubber inserts are open at their opposite ends and along the sides thereof to the air so that any undue compression or distortion produced in the rubber during operation of the joint will not result in the building up of any appreciable amount of heat in the inserts which might have a tendency to destroy the life thereof.

The present joint also is so designed that the torque transmission takes place against a plurality of relatively wide radial surfaces with all of the inserts cooperating to transmit the torque from the driving member to the driven member. Thus the unit pressure on the inserts is maintained at a low value, resulting in small unit pressure which greatly adds to the life and resilience of the joint. The present construction does not permit any localized stresses being imposed on any one of the inserts, but provides for each of the inserts taking only a small portion of the full load at any one time.

Other objects and advantages of the present invention will appear more fully from the following detailed description which, taken in conjunction with the accompanying drawing, will disclose to those skilled in the art the particular construction and operation of a preferred form of the present invention.

In the drawing:

Figure 1 is an elevational view of a universal coupling embodying the joints of the present invention;

Figure 2 is a sectional view taken substantially on line 2—2 of Figure 1 with portions broken away to show details of the assembly;

Figure 3 is an end view of one of the mating members of the joint; and

Figure 4 is a similar view of a corresponding member.

Referring now in detail to the drawing, in Figure 1 there is shown a coupling arrangement between a shaft 5, which may be considered the driving shaft, and a second shaft 6 to which torque is to be transmitted. Mounted on the end of the shaft 5 is a flange member 7 having the hub portion splined over the end of the shaft and having a radially extending disc-like face portion 8 to which is secured a first universal joint member 9, the member 9 corresponding in general to the construction shown in Figure 4. The coupling member 9 is provided with circumferentially spaced openings 10 which are adapted to receive suitable bolts, such as indicated at 11 in Figure 1, whereby the flange portion of the member 9 is securely bolted to the flange 8 of the member 7 for conjoint rotation therewith. The member 9 is adapted to have a plurality of axially extending arm portions 12 which are of generally angle shape and which are spaced about the face of the member 9 in such manner as to provide longitudinally directed slots or recesses 13 therebetween. Each of the arm portions 12 is adapted to have a recessed shoulder portion as indicated at 15 in Figures 1 and 4 for a purpose to be hereinafter described.

It is to be understood that the arm portions 12 may be formed as an integral part of the member 9, or may be separate members which are welded or otherwise rigidly secured thereto, and the invention is not to be limited to the exact showing as to the manner in which the arms are carried by the member 9. Extending into telescoping relation with respect to the member 9 is a mating coupling member, indicated generally at 16 and shown in detail in Figure 3. The member 16 is provided with an intermediate tubular portion 17 provided with a flanged end 18 to which may be secured in any suitable manner a torque transmitting shaft or tube, such as generally shown at 19. The opposite end of the member 16 is provided with radially extending arm portions 20, these arm portions preferably decreasing in thickness toward the outer ends thereof and being arranged in diametrically opposed pairs to form four projecting arm portions which are adapted to enter the recesses 13 and to be substantially centered therein, thereby providing opposed wedge shaped spaces between the walls of the arms 12 and the lateral surfaces of the arms 20.

Interposed between the arms 20 and the arms 12 are rubber cushioning members such as shown in detail in Figures 1 and 2. Each of these rubber cushioning members comprises a rubber body portion 22 which is provided on opposite lateral surfaces thereof with thin metallic plates, indicated at 23 and 24, the plate 23 being curved to the shape of the defining surfaces of the arms 12, while the plate 24 is curved to extend between the adjacent lateral surfaces of adjacent arms 20 on the member 16. As a result, these inserts are of generally angle shape and extend between two adjacent arms 20 of member 16, and the intermediate arm 12 of the member 9 complete filling this space. The shoulder portions 15 on the arms 12 serve to provide inward limiting stops for the plates 23, thereby limiting inward movement of the plates 23 with respect to the member 9 to provide for accurate positioning of the members 16 and 9 in telescoping relation.

The inserts are wedge shaped to conform to the tapering surface of the arms 20, having their smallest cross section at the corners thereof, but it will be noted that the entire surface of the arms 20 is adapted to exert compression against the members 22 for the transmission of torque therethrough to the member 9, or for receiving torque from the member 9. The inserts are locked on the arms 20 by means of the stud members 26 which extend through openings formed in the arms, and which at opposite ends, are provided with washers 27 engaging over the edges of the plates 24 at opposite ends thereof, thereby locking the plates 24 securely against relative axial movement with respect to the arms 20.

Inasmuch as the plates 24 are vulcanized to the body members 22, as are the plates 23, this provides for positive locking of the rubber inserts 22 against axial movement relative to either the member 9 or the member 16. As a further preventative for such movement and to secure the plate 23 against any lateral movement, the arm portions 12 are provided with tapped openings 28 adapted to receive suitable cap screws 29 threaded therein and provided with washers 30 of a diameter such as to extend over the adjacent edge of the corner portion of the plates 23, thereby securely holding these plates against the shoulders 15 and thus locking the plates 23 against axial movement relative to the arms 12. It will therefore be apparent that the inserts are locked securely against relative movement with respect to either the arms 20 or the arms 12, but are free to be compressed in a circumferential direction for the transmission of torque, and are also free to accommodate shear stresses caused by relative angular displacement between the members 9 and 16 which may be occasioned by misalinement of the shaft sections.

It is furthermore apparent that upon removal of the cap screws 29, the entire joint may be disassembled and the inserts may be replaced if so desired by merely moving the same out of engagement between the adjacent arms 20. This facilitates both the assembly of the joint to operating position and also the disassembly of the joint for inspection or replacement of any portions thereof.

In the assembly shown in Figure 1 the torque of the shaft 5 is transmitted to the member 9, and from this member is transmitted through the arms 12 to the arms 20 of the coupling member 16 by the compression of those portions of the inserts 22 disposed between the arms 12 and the arms 20 in the direction of rotation. This results in compression of corresponding leg portions of each of the inserts 22 in the assembly, thereby dividing the total torque among all of the inserts so that only a small unit compression is produced. This is materially facilitated also by the relatively large bearing surface between the arms and the inserts which distributes this compression over a considerable area of the insert. The torque transmitted to the coupling member in Figure 1 is in turn transmitted through the shaft section 19 into a second coupling member 16 at the opposite end thereof which is secured, as by welding indicated at 35, to the opposite end of the tubular shaft 19. The coupling member 16 is similarly mated to a coupling member 9 carried by the shaft section 6 with inserts 22 interposed therebetween in the manner previously described. However, in the second joint assembly, the action is reversed as the torque is transmitted from the arms 20 through the inserts to the arms 12 and thence through the member 9 to the shaft 6. In such case, the compression is exerted between the arms 20 and the arms 12 through the leg portions of the inserts disposed on the compression side of the assembly with respect to the direction of rotation thereof.

It will be apparent from the drawing that as the shaft sections 6 and 5 are not in axial alinement, there will be a tendency for the members 16 to cock with respect to the members 9. This cocking action results in shear stresses being imposed on the inserts 22, the shear being in opposite directions during each half revolution of the section. However, the rubber in shear is capable of withstanding extremely high stresses when vulcanized in sandwich form, as are the inserts 22. This shear stress within the limits of maximum misalinement is readily accommodated due to the fact that all leg portions of the inserts take a portion of this stress, and it is consequently distributed so that no one section has any localized stresses imposed thereon.

It will be apparent that there is no necessity for locking the inserts against radial displacement, since by reason of their angle construction, they are securely held against any radial movement relative to the arms 20 or the arms 12. Thus it is only necessary to lock the plates 23 and 24 against possible longitudinal movement with respect to the arms in order to insure proper functioning of the joint. This locking means as has been previously explained is so designed as to facilitate assembly and disassembly of the joint structure.

It should also be pointed out that the ends of the rubber inserts 22 are open radially to air, as are also the side walls thereof, there being a space provided between the flange portion of the member 9 and the point to which the inserts are telescoped with respect to the arms 12. This allows for free circulation of air over the surfaces of the rubber so that any heat caused by distortion of the members due to torque and misalinement stresses is readily distributed.

I am aware that various changes may be made in certain details of the locking and assembly principles herein involved, and I therefore do not intend to be limited except as defined by the scope and spirit of the appended claims.

I claim:

1. A universal joint comprising a first coupling member having L-shaped axially projecting arms spaced in such manner as to form a generally cross-shaped axial recess, a second coupling member having a series of radially extending tapered arms received in the arm portions of said recess when axially located therein, the arms of the coupling members defining L-shaped recesses when so located, and a plurality of separate rubber inserts of generally L-shape having thin metallic plates vulcanized thereto and engaged with said arms to position said inserts in said recesses for mechanically and electrically separating said coupling members.

2. A universal joint assembly comprising a pair of joint members, one member having radially extending arms and the other member having projecting arm means adapted to axially receive said arms and to define therewith generally L-shaped recesses between adjacent arms, and a plurality of separate correspondingly shaped rubber inserts secured in said recesses and subjected to compression for transmitting torque between said members.

3. A universal joint assembly comprising a first joint member including a disc portion and circumferentially spaced axially projecting arms, adjacent arms defining therebetween axial recesses, a second joint member having radially extending arms adapted to be received axially in said recesses and to define with said first-named arms radially extending wedge-shape openings communicating at the radial inner ends thereof with similar openings formed by adjacent arms, and a plurality of tapered L-shaped inserts having the arms thereof disposed in adjacent openings.

4. In combination, a first universal joint member having axially projecting arms forming a generally cross-shaped axial recess, a second member having a center portion with radially extending arms adapted to be axially telescoped into said recess and spaced therefrom, and a plurality of separate resilient L-shaped inserts disposed between said radial arms and said axially extending arms with the leg portions thereof extending radially along adjacent surfaces of adjacent radial arms.

5. A universal joint assembly comprising a first coupling member having a disc portion and a plurality of arms projecting axially from the face thereof and spaced to form a generally cross-shaped axial recess, a second coupling member having a hub centered in said recess and radially extending arms centered between said first-named arms, rubber inserts comprising rubber body portions having thin metallic plates bonded to opposite sides thereof, one of said plates engaging the adjacent lateral surfaces of two adjacent radial arms, and the other plate engaging the corresponding adjacent surfaces of one of said axially projecting arms disposed therebetween.

6. The assembly of claim 5 further characterized in the provision of means spacing said inserts away from the face of said disc portion.

7. The assembly of claim 5 including means for spacing the surfaces of said body portions not bonded to said plates away from contact with any portions of said coupling members.

8. A universal joint comprising a pair of coupling members having radially disposed force-transmitting elements on the adjacent faces thereof adapted to telescope axially in operative relation and in operative relation defining a plurality of circumferentially spaced L-shaped recesses each including outermost relatively wide portions tapering inwardly to an intermediate relatively narrow connecting portion, and a separate force-transmitting unit disposed in each of said recesses, comprising a pair of metallic L-shaped plates of different angularity and an L-shaped rubber insert disposed between and vulcanized to said plates, said plates being arranged relative to one another with the corresponding arm portions thereof diverging outwardly and the units being disposed under compression in said recesses in force-transmitting relation to said elements to transmit force of compression uniformly throughout the surfaces thereof engaging the elements.

9. A universal joint comprising a pair of coupling members having radially disposed force-transmitting elements adapted to telescope axially in operative relation and in operative relation defining a plurality of circumferentially spaced L-shaped recesses each including outermost relatively wide portions tapering inwardly to intermediate relatively narrow connecting portion, and a separate force-transmitting unit disposed in each of said recesses comprising a pair of L-shaped plates of different angularity and an L-shaped rubber insert disposed between and vulcanized to said plates, said plates being arranged relative to one another with the corresponding arm portions thereof diverging outwardly and the units being disposed in said recesses in force-transmitting relation to said elements to transmit force of compression uniformly throughout the surfaces thereof engaging the elements.

10. A universal joint comprising a pair of coupling members having radially disposed force-transmitting elements adapted to telescope axially in operative relation and in operative relation defining a plurality of circumferentially spaced L-shaped recesses, and a separate force-transmitting unit disposed in each of said recesses comprising a pair of plates and an L-shaped rubber insert disposed between and vulcanized to said plates, said units being disposed in said recesses in force-transmitting relation to said elements to transmit force of compression uniformly throughout the surfaces thereof engaging the elements.

11. A universal joint comprising a pair of coupling members having radially disposed force-transmitting elements adapted to telescope axially in operative relation and in operative relation defining a plurality of circumferentially spaced L-shaped recesses, and a separate force-transmitting unit disposed in each of said recesses comprising a pair of metallic L-shaped plates and an L-shaped rubber insert disposed between and vulcanized to said plates, said units being disposed under compression in said recesses in force-transmitting relation to said elements to transmit force of compression uniformly throughout the surfaces thereof engaging the elements.

12. A universal joint comprising a coupling member having a plurality of radially extending arms tapering outwardly, a further coupling member having L-shaped elements spaced circumferentially thereon to provide a generally cross-shaped recess telescopingly receiving said arms, said elements and arms defining generally L-shaped recesses when said coupling members are in operative position with said arms and elements in axially telescoping relation, and a plurality of separate force-transmitting units disposed in said recesses, each comprising a pair of L-shaped plates adapted respectively to engage said arms and elements in force-transmitting relation thereto and having a rubber insert disposed between the same and vulcanized thereto throughout the force-transmitting area thereof, said units being effective to transmit force between said arms and elements only by compression.

13. A universal joint comprising a coupling member having a plurality of radially extending arms tapering outwardly, a further coupling member having elements spaced circumferentially thereon to provide a generally cross-shaped recess telescopingly receiving said arms, said elements and arms defining generally L-shaped recesses when said coupling members are in operative position with said arms and elements in axially telescoping relation, and a plurality of separate force-transmitting units disposed in said recesses, each comprising a pair of L-shaped plates adapted respectively to engage said arms and elements in force-transmitting relation thereto and having a rubber insert disposed between the same and vulcanized thereto, said units being effective to transmit force between said arms and elements only by compression.

14. In a universal joint including a pair of coupling members provided with circumferentially spaced force-transmitting elements, the elements of one member being alternated with those of another when said coupling members are in operative position with said elements in axially telescoping relation, a plurality of separate force-transmitting units associated with said members, each comprising a pair of L-shaped plates adapted to engage the elements of said members respectively in force-transmitting relation thereto and having a rubber insert disposed between the same and vulcanized thereto throughout the force-transmitting area thereof, said units being effective to transmit force between said elements only by compression.

ALFRED O. WILLIAMS.